3,522,188
USE OF ALPHA-ALKYL (OR ALKENYL) BENZYL-
IDENE MALONONITRILES AS U.V. ABSORBERS,
AND STABILIZED COMPOSITIONS AND LIGHT
FILTERS CONTAINING SAME
Albert F. Strobel, Delmar, and Sigmund C. Catino, Castleton, N.Y., assignors to GAF Corporation, New York, N.Y., a corporation of Delaware
No Drawing. Filed June 27, 1962, Ser. No. 205,491
Int. Cl. C08f 45/60; C08g 51/60; F21v 9/06
U.S. Cl. 252—300                22 Claims

ABSTRACT OF THE DISCLOSURE

Compositions, especially organic compositions, having superior resistance to degradation deterioration when exposed to actinic radiation, particularly ultraviolet radiation, are provided by the incorporation therewith of alpha-alkyl (or alkenyl) benzylidene malononitrile, which functions as an ultraviolet absorber. Light filters are also provided by incorporating an alpha-alkyl (or alkenyl) benzylidene malononitrile in a light pervious support layer.

---

This invention relates to new and useful compositions which are characterized as having superior resistance to degradation and deterioration when exposed to actinic radiation and in particular to organic compositions which are protected against deterioration when exposed to such radiations by the incorporation therewith of α-alkyl (or alkenyl) benzylidene malononitrile. This invention further relates to processes for preventing the deterioration and degeneration of organic materials when exposed to actinic radiations, and in particular to ultraviolet radiations. This invention still further relates to processes for the stabilization against deterioration by ultraviolet light of organic materials by the use of α-alkyl (or alkenyl) benzylidene malononitrile.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultraviolet range. Such uses include incorporation in plastic sheet materials and the stabilization in general of transparent plastic bodies. By far, the greatest concern with respect to ultraviolet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultraviolet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultraviolet light. It is well known that colored objects such as dyed textiles will fade on exposure to sunlight, and in particular to ultraviolet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered that by combining α-alkyl (or alkenyl) benzylidene malononitrile with organic materials, there results compatible combinations with a vast number of film forming plastics, resins, gums, waxes and the like, which combinations further exhibit outstanding ultraviolet absorbing properties within the generally encountered ultraviolet region of 250 to 400 millimicrons. The compounds which are employed in the compositions and processes of this invention, even though they exhibit outstanding absorbing properties close to the visible region of the electro magnetic field, nevertheless are essentially colorless compounds and can be employed with the assurance that they will not contribute to color in normally colorless formulations, nor will they affect the color of a colored formulation such as a paint film or a dyed textile. Many of the compounds employed in the compositions and processes of this invention also absorb some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxys, melamines and the like. While the compounds of the present invention do not require an hydroxyl group, the presence thereof is not a disadvantage, or detriment where alkaline sensitivity is no problem.

It is therefore an object of the present invention to provide new and useful compositions characterized by improved resistance to degradation and deterioration by ultraviolet radiation.

It is still another object of this invention to provide compositions containing α-alkyl (or alkenyl) benzylidene malononitrile which are resistant to ultraviolet deterioration.

It is a still further object of this invention to provide processes for improving the resistance of organic materials to deterioration and degradation by actinic radiation and especially ultraviolet radiation.

It is a still further object of this invention to provide compositions and processes for improving the resistance of organic materials to deterioration and degradation by actinic radiations including short wavelength visible radiations.

Other objects and advantages will appear hereinafter as the description proceeds.

The α-alkyl (or alkenyl) benzylidene malononitrile which is employed in the compositions and processes of this invention is devoid of nitro groups and is characterized by the following general formula:

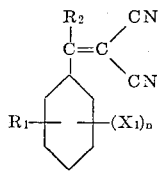

wherein $R_1$ may be hydroxyl, alkoxy, aralkoxy; phenyl, substituted phenyl, phenoxy and substituted phenoxy; $R_2$ may be alkyl of from 1 to about 30 carbon atoms or alkenyl of from 3 to about 30 carbon atoms; and $X_1$ is any group which does not have an auxochromic effect, and its bathochromism is less than 250 A. Since the utility of the subject compounds is dependent in the main upon a lack of color, any grouping or substituent which increases the wavelength of the peak absorption point more than 250 A. is to be avoided since this will shift such absorption into the visible region, that is, beginning at about 3600 to 4000 A. The groupings to be specifically avoided, therefore, as substituents for $X_1$ are nitro (often classified as a chromophore but for the purposes of this categorization, auxochromic or bathochromic is definitive), oxy, i.e., —O—, and amino, i.e., —N. All other groupings are satisfactory although some may have a bathochromic effect but nevertheless not as much as 250 A. such substituents as suitable include:

halo (e.g., —Cl)
alkyl (e.g., —CH₃)
aryl (e.g., —⬡)
alkyl SO₂— (e.g., CH₃SO₂—)
—carbalkoxy (e.g., —COOC₂H₅)
—carbaryloxy (e.g., —COO—⬡)
—OSO₂R (e.g., —OSO₂CH₃; —OSO₂—⬡)
—OCR‖O (e.g., —OCCH₃‖O; —OC‖O—⬡)

and $n$ is an integer from 0 to 4.

As suitable $R_1$ substituents, there may be employed in addition to hydroxyl, phenyl, and phenoxy, the following: methoxy, ethoxy, n-propoxy, iso-propoxy, n-butoxy, iso-butoxy, t-butoxy, n-amyloxy, iso-amyloxy, n-hexyloxy, n-octyloxy, iso-octyloxy, n-nonyloxy, iso-nonyloxy, n-decoxy, n-lauryloxy, stearyloxy, and the like.

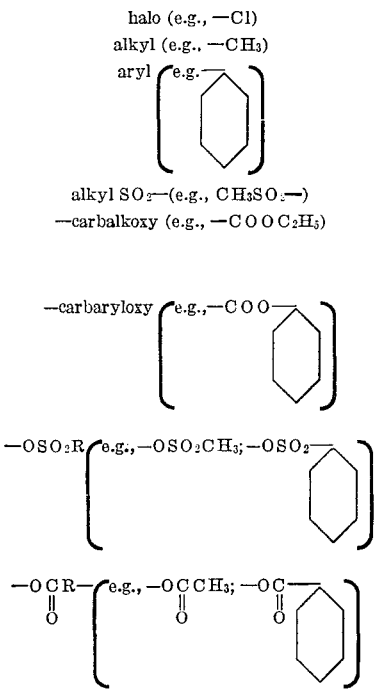

α-naphthyl, β-naphthyl, α-anthracyl, cumyl, phenanthryl and the like, and the corresponding oxy compounds, e.g., (⬡—O—; C₂H₅OOC—⬡—O—)

In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. From 1 to about 100 moles of oxyalkylating agent may be used.

Specific ketones which may be employed include the following:

2'-hydroxyacetophenone
4'-hydroxyacetophenone
2'-phenylacetophenone
4'-phenylacetophenone
4'-phenoxyacetophenone
4'-(p-carboxyphenyl)acetophenone
2'-(o-carboxyphenyl)acetophenone
2',3'-dimethyl-4'-hydroxyacetophenone
3'-bromo-4'-hydroxyacetophenone
3'-bromo-5'-fluoro-2'-hydroxyacetophenone
3'-allyl-4'-hydroxyacetophenone
3'-allyl-2'-hydroxyacetophenone
3'-allyl-2'-hydroxy-5'-methylacetophenone
5'-ethyl-2'-hydroxybutyrophenone
4'-ethyl-2'-hydroxy-6'-methylbutyrophenone
4'-hydroxyoctanophenone
2'-hydroxy-5'-methyl octanophenone
4'-hydroxyhexadecaphenone
5'-methyl-2'(p-tolyloxy)acetophenone
p(p-chlorophenyl)stearophenone
p(p-tolyl)stearophenone
4'-(p-hydroxyphenoxy)acetophenone
4'-(m-hydroxyphenoxy)acetophenone
2'-hydroxy-4'-pentadecylacetophenone
2'-hydroxy-3'-methylacetophenone
2'-hydroxy-4'-methylacetophenone
2'-hydroxy-5'-methylacetophenone
2'-hydroxy-4'-iodoacetophenone
3'-hydroxy-4',5'-dimethylacetophenone
3'-bromo-4'-hydroxybutyrophenone
3'-tertiary butyl-2'-OH-6'-methylbutyrophenone
3',5'-dibromo-4'-OH-methylbutyrophenone
4'-phenylbutyrophenone
2'-hydroxy-crotonophenone
4'-ethoxy-β-methylcrotonophenone
2'-hydroxypentenophenone
5'-chloro-2'-hydroxycrotonophenone
4'-methoxy-3-methyl-2-pentenophenone
4'-methoxy-2-hexenophenone
3'-tert.butyl-3'-chloro-2'-hydroxypentenophenone
2'-hydroxy-4',5'-dimethylpentenophenone
2'-phenyl-4-hexenophenone
2'-methoxy-4-heptenophenone
2'-methoxy-6-heptenophenone
2'-methoxy-2-octenophenone The general process for the preparation of the compounds of this invention is well known and involves a condensation of the selected alkylphenone derivative with malononitrile in a suitable solvent under such conditions that dehydration occurs to form the substituted ethylene. When the phenyl ring vicinal to the keto group contains additional positive substituents, e.g., —CH$_3$, it may be desirable to employ in place of malononitrile, cyanoacetamide in the condensation and effect conversion of the amido group to the nitrile by dehydration with from 5 to 10 times by weight based on the weight of amide of phosphorous oxychloride (POCl$_3$). The general procedure is to heat the cyanoacetamide for 2–4 hours at about 55–65° C., drown in water and filter. The following example will serve to illustrate the compositions of this invention without being deemed limitative thereof. Parts are by weight unless otherwise indicated.

EXAMPLE 1

A nitrocellulose lacquer composition is prepared of the following:

20% {
46 parts ½ sec. nitrocellulose
4 parts α-methyl-4-hydroxybenzylidenemalononitrile
35 parts Cellolyn 502 (non-drying plasticizing liquid resin of Hercules Powder Co.)
15 parts dibutyl phthalate
}

80% {
35 parts butyl acetate
15 parts butanol
50 parts toluene
}

The lacquer is drawn out on a metal plate with a bird film applicator to give a film of 3 mils thickness. A similar film is prepared by drawing out a lacquer formulation similar to the one above but in place of the malononitrile compound, 4 additional parts of nitrocellulose are added. After exposure to light for 100 hours, the film prepared without the malononitrile compound develops a distinct yellow color whereas the film containing this ultraviolet absorber shows no appreciable change.

EXAMPLE 2

The malononitrile of Example 1 is incorporated into a cellulose acetate film as follows:

|  | G. |
|---|---|
| Malononitrile of Example 1 | 0.375 |
| Ethanol | 3.5 |
| Methyl Cellosolve | 6.5 |
| Ethyl acetate | 9.0 |
| Cellulose acetate dope (3.75 g. cellulose acetate in 22.85 g. acetone) | 26 | are mixed with stirring and a clear solution is obtained. The material is poured into a mold and the solvent is evaporated to give a block of cast material of ⅛ inch thickness. A similar block is prepared in the same manner omitting the malononitrile absorber. The material containing the ultraviolet absorber gives better stability to light to food materials stored behind it than the cast block without the ultraviolet absorber.

EXAMPLE 3

1 g. of α-methyl-2-hydroxybenzylidenemalononitrile is dissolved in 100 g. of Polylite 8000 (a polyester resin of 30% styrene and 70% glycerylphthalatemaleate) containing 1% benzoyl peroxide. A casting is made between opal glass plates treated with a siloxane mold release agent (DRI-Film SC–87). Between the plates and around the edges thereof a gasket material of Tigon tubing is used. Clamps are employed to hold the plates secure against the gasket. The polyester is poured into the mold and cured as follows: initial oven temperature=65° C. The temperature is raised slowly to 90° and held for 1 hour. The temperature is then raised to 120° C. and held for ½ hour to complete the curing cycle. The cast polymer containing the ultraviolet absorber gives outstanding protection against sunlight fading to clothing exhibited behind it. A similar casting free of the absorber gives no protection whatsoever and coloration of the clothing fades particularly.

EXAMPLE 4

Example 2 is repeated using the compound α-methyl-2-phenylbenzylidene malononitrile.

EXAMPLE 5

Example 2 is repeated employing α-methyl-4-phenylbenzylidene malononitrile.

EXAMPLE 6

Example 1 is repeated employing α-methyl-4-phenoxybenzylidene malononitrile.

EXAMPLE 7

Example 1 is repeated employing α-butyl-5-ethyl-2-hydroxybenzylidene malononitrile.

EXAMPLE 8

Example 1 is repeated employing α-methyl-4-methoxybenzylidene malononitrile.

EXAMPLE 9

0.5 g. of α-methyl-4-n-dodecycloxybenzylidene malononitrile is melted together with 99.5 g. of polyethylene wax PT95504 (Semet-Solvay) at 120° C. to give a solution. The material is then pressed out in a Carver press to give a film about 1/32 in thick. Meat stored behind the film containing the absorber is less discolored on exposure to ultraviolet light than meat stored behind a similar film prepared without absorber.

EXAMPLE 10

A furniture polish is prepared as follows: A melt is made on a steam bath of:

Carnauba wax, oz. _____ 9
Turpentine, pints _____ 1.5
Hot water containing 2 oz. soap, pints _____ 1.75

The whole mixture is beaten with a high speed stirrer. A similar formulation is made containing 2% by weight based on the weight of α-ethyl-4-hydroxybenzylidene malononitrile. The formulation containing the absorber when applied to stained and varnished oak gives better protection against discoloration (darkening) by light than the formulation free of the absorber.

EXAMPLE 11

1.7 g. of the absorber used in Example 1 is added to the following composition:

|   | G. |
|---|---|
| Methyl acrylate | 160 |
| Butyl acrylate | 16 |
| Trition X–200 (an alkyl aryl polyether sulfonate dispersing agent) | 20 |
| Ammonium persulfate | 0.3 |
| Water | 176 |

The mixture is added to 500 ml. water over a 2½ hour period and then refluxed for 3 hours. It is then sprayed on leather, pressed between plates and dried. Excellent resistance to yellowing is exhibited by the treated leather.

EXAMPLE 12

5% by weight of absorber of Example 1 is added to an acrylonitrile-butadiene latex (Chemgum 247). The absorber is previously made as a 50% dispersion with Tamol NNO (formaldehydenaphthalene-2-sodium sulfonate). Excellent protection against yellowing is afforded films formed from the latex. Foamed vinyl polymers (e.g., polyvinyl chloride) and foamed polyurethanes are also admirably protected when treated with the product used in Example 1.

EXAMPLE 13

Example 9 is repeated using 0.5 g. of α-octadecyl-4-methoxy benzilidene malononitrile. The polyethylene film is well stabilized.

EXAMPLE 14

The p-tolyl stearophenone condensate with malononitrile is used as in Example 9 with similar results.

EXAMPLE 15

In the following examples, Example 4 is repeated employing the indicated phenones condensed in each instance with malononitrile:

(a) (p-chlorophenyl)stearophenone
(b) 4'-phenyl butyrophenone
(c) 4'-(p-hydroxyphenoxy)acetophenone
(d) 2'-hydroxy crotonophenone
(e) 4'-methoxy-β-methyl crotonophenone

EXAMPLE 16

In the following examples, Example 9 is repeated employing the indicated phenones condensed in each instance with malononitrile:

(a) 2'-phenyl-4-hexenophenone
(b) 2'-methoxy-2-octenophenone
(c) 2'-hydroxy-4',5'-dimethyl pentenophenone

EXAMPLE 17

The stabilizer produced by condensing (4'-carboxamido phenyl) acetophenone with malononitrile is treated with 5 moles of ethylene oxide per mole of product in the presence of 1.2% potassium hydroxide in an autoclave at 75° C. The product which has the formula:

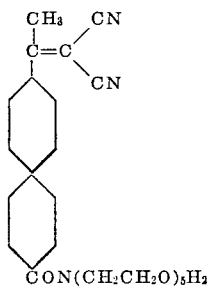

and produces excellent, stabilized oil-in-water emulsions (e.g., 1 part mineral oil-1 part water).

EXAMPLE 18

Example 17 is repeated employing the following moles of alkylene oxide:

(a) 16 moles ethylene oxide
(b) 40 moles ethylene oxide
(c) 100 moles ethylene oxide
(d) 10 moles propylene oxide
(e) 6 moles propylene oxide+10 moles ethylene oxide

EXAMPLE 19

Examples 17 and 18 are repeated with the following stabilizers:

(a) 15(c)
(b) 15(d)
(c) 16(c)

The compounds employed in this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultraviolet absorbers employed with this invention can be used not only to stabilize clear films, plastics and the like, but they may be employed in opaque, semi-opaque or translucent materials, the surface of which is susceptible to degradation by ultraviolet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein.

The compounds used in the present invention have also been found to be admirably suited for incorporation into the transparent or translucent backings of the various pressure sensitive type adhesive tapes presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus in the case of a regenerated cellulose tape, one may coat the back thereof with one of the cellulosic lacquers hereinbefore described in Examples 1 and 2. For direct incorporation into a film of regenerated cellulose, one may employ any of the compounds herein disclosed, and particularly those which have been polyoxyalkylated as described, for example, in Examples 17 and 18(a), (b), (c), and (e). In this instance, it is preferred to impregnate the regenerated cellulose in the gel state before final drying thereof.

Other variations in and modifications of the described processes which will be obvious to those skilled in the art can be made in this invention without departing from the scope or spirit thereof.

We claim:

1. A composition comprising an organic material susceptible to ultraviolet light degradation and containing from about 0.1% to about 10% by weight based on the weight of said organic composition of an essentially colorless compound devoid of nitro groups and of the formula:

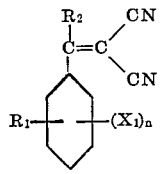

wherein
(1) $R_1$ is a radical selected from the group consisting of hydroxy, alkoxy, phenyl, phenoxy and substituted phenyl and phenoxy;
(2) $R_2$ is selected from the group consisting of alkyl of from 1 to about 30 carbon atoms and alkenyl of from 3 to about 30 carbon atoms;
(3) $X_1$ is a non-auxochrome having a bathochromism of less than 250 A.; and
(4) $n$ is an integer from 0 to 4.

2. A composition as defined in claim 1 wherein $R_1$ is hydroxy and $R_2$ is alkyl.

3. A composition as defined in claim 1 wherein $R_1$ is alkoxy and $R_2$ is alkyl.
4. A composition as defined in claim 1 wherein $R_1$ is phenyl and $R_2$ is alkyl.
5. A composition as defined in claim 1 wherein $R_1$ is phenoxy and $R_2$ is alkyl.
6. A composition as defined in claim 1 wherein $R_1$ is substituted phenyl and $R_2$ is alkyl.
7. A composition as defined in claim 1 wherein $R_1$ is substituted phenoxy and $R_2$ is alkyl.
8. A composition as defined in claim 1 wherein $R_1$ is hydroxy and $R_2$ is alkenyl.
9. A composition as defined in claim 1 wherein $R_1$ is alkoxy and $R_2$ is alkenyl.
10. A composition as defined in claim 1 wherein $R_1$ is phenyl and $R_2$ is alkenyl.
11. A composition as defined in claim 1 wherein $R_1$ is hydroxy and $R_2$ is methyl.
12. A composition as defined in claim 1 wherein $R_1$ is methoxy and $R_2$ is methyl.
13. A composition as defined in claim 1 wherein $R_1$ is n-dodecyloxy and $R_2$ is methyl.
14. A composition as defined in claim 1 wherein $R_1$ is hydroxy and $R_2$ is ethyl.
15. A composition as defined in claim 1 wherein $R_1$ is phenyl and $R_2$ is methyl.
16. A composition as defined in claim 1 wherein $R_1$ is methoxy and $R_2$ is octadecyl.
17. A composition as defined in claim 1 wherein $R_1$ is tolyl and $R_2$ is octadecyl.
18. A composition as defined in claim 1 wherein $R_1$ is phenoxy and $R_2$ is alkenyl.
19. A light filter for protecting substances from ultraviolet radiation, inclusive of light within the range of 330 mμ–400 mμ, the filter consisting essentially of a light pervious support layer having incorporated therewith a substantial light absorbing amount of a compound having the formula:

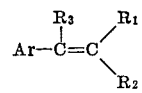

wherein Ar is a phenyl substituted by a member selected from the group consisting of hydroxy, alkoxy, and, when desired, at least one additional substituent selected from the group consisting of halogen and alkyl; $R_1$ is CN; $R_2$ is CN; and $R_3$ is an alkyl group.

20. Ultraviolet light protective light filter consisting of a film-forming composition having incorporated therein, in an amout to substantially absorb radiation in the range of 330 mμ–400 mμ, consisting of a film forming composition having incorporated therein, in an amount sufficient to absorb ultraviolet rays, 4 - hydroxy-phenyl-β-methyl-α-cyano-cinnamic acid nitrile.

21. A method for protecting and stabilizing a substance from ultraviolet light, inclusive of light within the wavelength 330 mμ–400 mμ, consisting in incorporating into said substance, and, when desired, into a light pervious support layer interposed between said substance and an ultraviolet light source, a substantial light-absorbing amount of a compound having the formula:

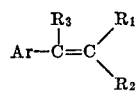

wherein Ar is a phenyl substituted by a member selected from the group consisting of hydroxy, alkoxy and, when desired, at least one additional substituent selected from the group consisting of halogen and alkyl; $R_1$ is CN; $R_2$ is CN; and $R_3$ is an alkyl group.

22. A method according to claim 21 wherein said incorporated compound is 4-hydroxy-phenyl-$\beta$-methyl-$\alpha$-cyano-cinnamic acid nitrile.

References Cited

UNITED STATES PATENTS

| | | | |
|---|---|---|---|
| 2,683,659 | 7/1954 | Schlesinger et al. | 260—465 |
| 2,839,402 | 6/1958 | Edwards et al. | 260—465 |
| 3,052,636 | 9/1962 | Strobel et al. | 260—45.9 |
| 3,079,366 | 2/1963 | Boyle et al. | 260—45.9 |
| 3,111,417 | 11/1963 | Strobel et al. | 260—45.9 |
| 3,081,280 | 3/1963 | Carlson | 260—45.9 |
| 3,180,885 | 4/1965 | Nentwig et al. | 260—465 |
| 3,278,448 | 11/1966 | Laurer et al. | 260—45.85 |

RICHARD D. LOVERING, Primary Examiner

U.S. Cl. X.R.

106—168, 195; 252—312, 357, 401, 403; 260—45.85, 45.9